(12) United States Patent
Jun et al.

(10) Patent No.: US 7,405,502 B2
(45) Date of Patent: Jul. 29, 2008

(54) MOTOR AND WASHING MACHINE INCLUDING THE SAME

(75) Inventors: Cha Seung Jun, Seoul (KR); Byoung Wook Min, Seoul (KR)

(73) Assignee: LG Electronics Inc., Seoul (KR)

( * ) Notice: Subject to any disclaimer, the term of this patent is extended or adjusted under 35 U.S.C. 154(b) by 6 days.

(21) Appl. No.: 11/519,808

(22) Filed: Sep. 13, 2006

(65) Prior Publication Data
US 2007/0182264 A1   Aug. 9, 2007

(30) Foreign Application Priority Data
Sep. 13, 2005   (KR) ...................... 10-2005-0085000

(51) Int. Cl.
*H02K 21/12*   (2006.01)
(52) U.S. Cl. ................................. 310/156.01; 310/263
(58) Field of Classification Search ............ 310/156.26, 310/156.28, 156.43, 156.12, 156.15, 156.59, 310/156.61, 263
See application file for complete search history.

(56) References Cited

U.S. PATENT DOCUMENTS

| | | | | |
|---|---|---|---|---|
| 3,237,059 | A * | 2/1966 | Meyerer | 335/210 |
| 4,137,473 | A * | 1/1979 | Pfister | 310/98 |
| 5,483,116 | A * | 1/1996 | Kusase et al. | 310/263 |
| 7,030,529 | B2 * | 4/2006 | Dommsch et al. | 310/156.22 |
| 2003/0110860 | A1 * | 6/2003 | Okada | 73/593 |
| 2005/0040721 | A1 * | 2/2005 | Kusase et al. | 310/156.43 |
| 2005/0146235 | A1 * | 7/2005 | Kim et al. | 310/67 R |
| 2005/0264107 | A1 * | 12/2005 | Joong et al. | 310/12 |
| 2007/0182264 | A1 * | 8/2007 | Jun et al. | 310/156.38 |

* cited by examiner

*Primary Examiner*—Thanh Lam
(74) *Attorney, Agent, or Firm*—McKenna Long & Aldridge LLP

(57) ABSTRACT

Provided are a motor and a washing machine using the motor. The motor has a stator, a rotor, a rotor frame, a permanent magnet, and a comb polarizing ring. The rotor rotates against the stator. The permanent magnet is installed on the rotor frame and has protrusions with alternating North and South polarities. The comb polarizing ring includes a plurality of teeth disposed between the protrusions of the permanent magnet, and is formed of a material with a magnetism that is weaker than a magnetism of the protrusions.

18 Claims, 5 Drawing Sheets

[Figure 1]
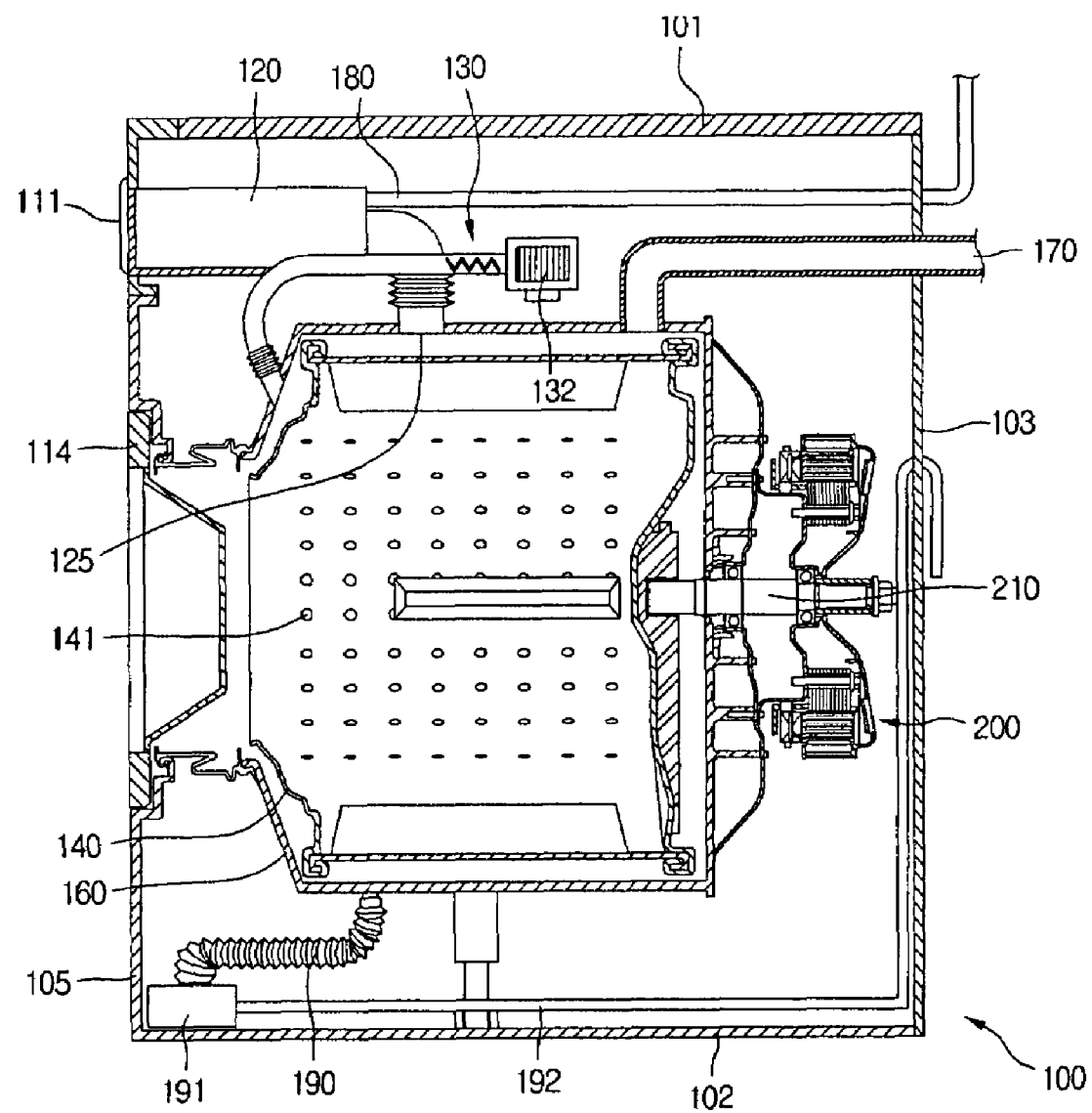

[Figure 2]
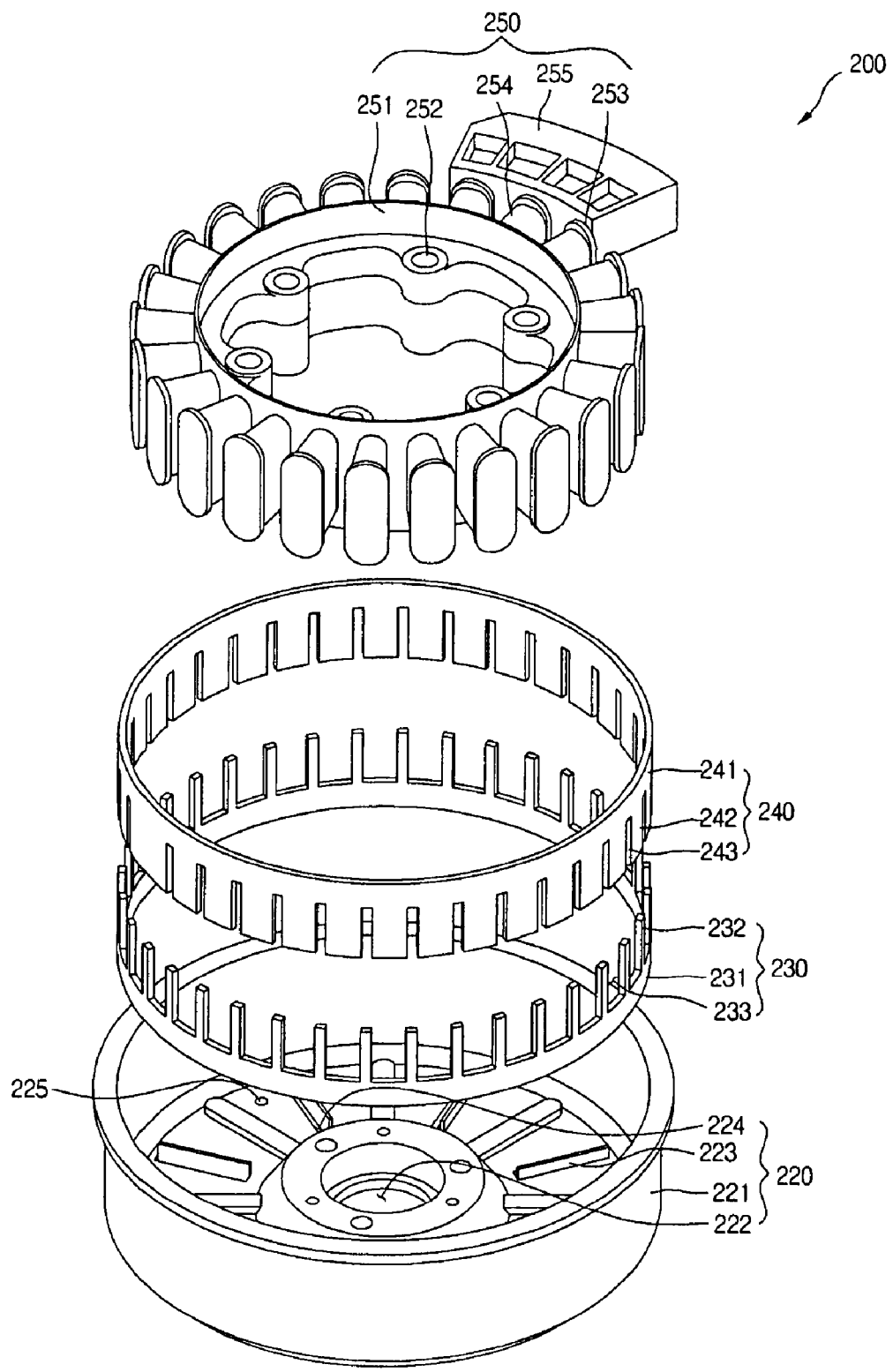

[Figure 3]
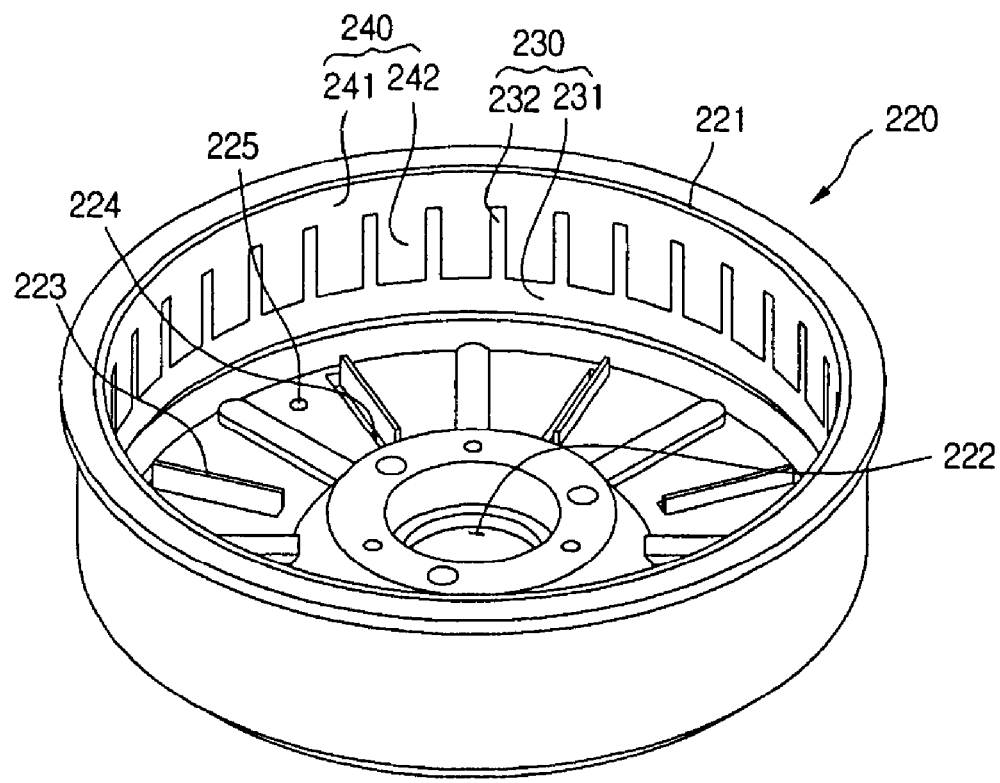

[Figure 4]
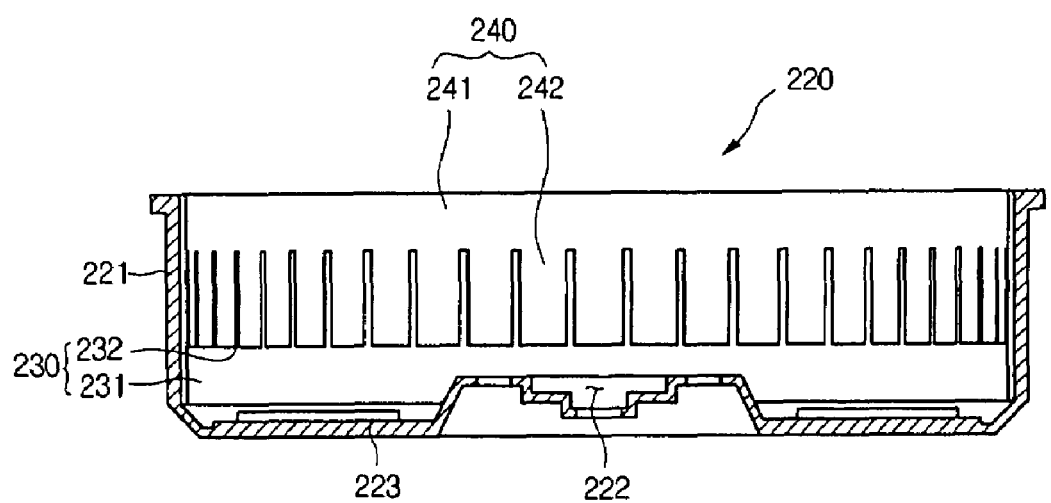

【Figure 5】
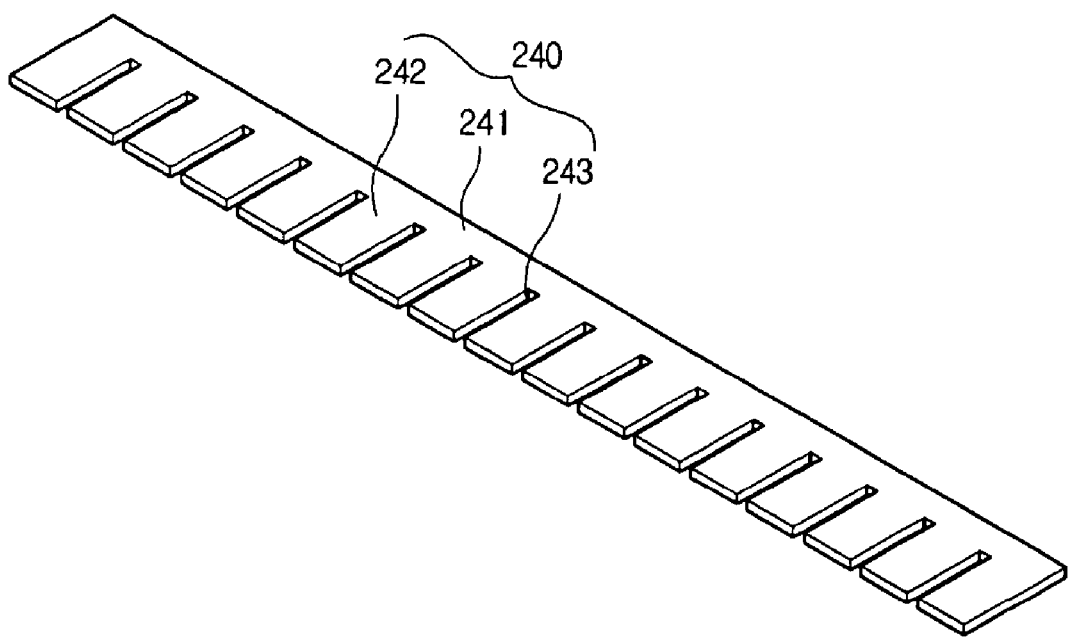

MOTOR AND WASHING MACHINE INCLUDING THE SAME

This application claims the benefit of Korea Patent Application No. 10-2005-0085000, filed on Sep. 13, 2005, which is hereby incorporated by reference for all purposes as if fully set forth herein.

BACKGROUND OF THE INVENTION

1. Field of the Invention

The present invention relates to a motor, and more particularly, to a motor and a washing machine including the motor.

2. Description of the Related Art

A motor is a machine that converts electrical energy to mechanical energy, and is often referred to as a drive unit. A motor works on the principle of electromagnetic induction. Although most motors generate force in a rotational manner, some generate force linearly. Motors are categorized into direct current (DC) motors and alternating current (AC) motors, depending on their power source.

A washing machine is an apparatus that employs a motor described above as its main driving source, and uses detergent mixed into water to wash laundry and remove impurities therefrom over the course of wash, rinse, and spin cycles. A washing machine has a mechanical unit that the energy of the motor or drive unit to wash laundry, a control unit that controls the wash course, and a water supplying and draining device to fill and drain the washing compartment. Washing machines being used today can largely be divided into drum-type, agitator-type, and pulsator-type washing machines.

According to their projected load, the above-described motors uses permanent magnets to which current is applied, forming a predetermined phase angle to rotate the motor based on Fleming's Left-Hand Rule. To generate maximum torque during the wash cycle, the phases of the current are controlled to be in phase with phases of counter electromotive force, and to generate high speed in the spin cycle, the phases of current are controlled to precede the phases of counter electromotive force.

A large quantity of permanent magnets is used in motors according to the related art. Because a permanent magnet is an expensive material by weight, the manufacturing cost of a motor increases.

Also, because motors according to the related art use rotor frames that are press manufactured thin steel plates, the frames have low rigidity and reduced concentricity and roundness. Therefore, vibration and noise are pronounced during motor operation.

SUMMARY OF THE INVENTION

Accordingly, the present invention is directed to an electric motor and a washing machine using the electric motor that substantially obviate one or more problems due to limitations and disadvantages of the related art.

An object of the present invention is to provide a motor with improved performance and a structure that uses a reduced quantity of permanent magnets, and a washing machine using the motor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a motor having a stator and a rotor rotating against the stator, the motor including: a rotor frame; a permanent magnet installed on the rotor frame and having protrusions with alternating North and South polarities; and a comb polarizing ring including a plurality of teeth disposed between the protrusions of the permanent magnet, and formed of a material with a magnetism that is weaker than a magnetism of the protrusions.

In another aspect of the present invention, there is provided a washing machine including: a case; a tub installed inside the case, for holding wash liquid; a drum installed inside the tub, for holding laundry; and a motor including a permanent magnet having protrusions forming alternating North and South polarities, and a comb polarizing ring having teeth disposed between the protrusions of the permanent magnet and formed of a material having a weaker magnetism than the permanent magnet and, and a stator coupled to the rotor, wherein the motor imparts rotational force to the drum.

In the above-structured motor and washing machine employing the motor, a comb polarizing ring having teeth is installed in the rotor frame, and a permanent magnet having protrusions is fitted to the comb polarizing ring. Thus, the performance of the motor is equal to or better than that of a conventional motor, while using less permanent magnet material. Accordingly, the manufacturing cost of the motor is reduced.

Also, in the motor and the washing machine using the motor according to the present invention, the comb polarizing ring reinforces the rotor frame to increase its rigidity. Therefore the motor has improved concentricity and roundness, which leads to less vibration and noise during operation.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is an upright sectional view of a washing machine according to the present invention;

FIG. 2 is an exploded perspective view of a motor according to the present invention;

FIG. 3 is a perspective view of a rotor of a motor according to the present invention;

FIG. 4 is a sectional view of the rotor in FIG. 3; and

FIG. 5 is a perspective view of a permanent magnet before it is installed in a rotor of a motor according to the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

FIG. 1 is an upright sectional view of a washing machine according to the present invention.

Referring to FIG. 1, a drum-type washing machine according to the present invention has a main body 100 with a cabinet 103 fixed to an upper plate 101 and a lower plate 102, to form an interior space. A motor 200 and a drum 140 are installed within the space to directly wash laundry. The motor 200 is supplied with current from a power source to rotate a drive shaft 210. The drive shaft 210 passes through a tub 160 and is fixed to the rear surface of the drum 140, so that when the drive shaft 210 rotates the drum 140 at one side thereof, the opposite side of the drum 140 may be formed with an opening juxtaposed to a door 114 formed in the cabinet 103. Also, the drum 140 is surrounded by the tub 160 which is sealed to prevent water mixed with a cleaning agent such as detergent (hereinafter referred to as 'wash liquid') that fills the drum 140 from leaking. Thus, when the motor 200 is installed outside of the tub 160, the drive shaft 210 extending from the motor 200 is fixed to the drum 140 while passing through the tub 160.

The tub 160 that is installed within the main body 100 communicates with a ventilating duct 130 on a side thereof, and is substantially cylindrical in shape, has an opened front end, and has the drive shaft 210 passing through the rear thereof. Also, the tub 160 must be sealed because wash liquid must be filled therein during a wash cycle. Here, the drum 140 is disposed within the tub 160, and is fastened to the drive shaft 210 extending from the motor 200 to be rotated by the drive shaft 210. Also, the drum 140 has a plurality of through-holes 141 formed therein that allow wash liquid that is supplied from a wash liquid dispenser 125 into the tub 160 to enter the inside of the drum 140 to form a predetermined water level therein. Also, the through-holes 141 allow wash liquid to be easily drained from the drum 140 during a spin cycle after a wash cycle has been completed. Furthermore, during a drying cycle, hot air that is dispensed into the tub 160 through a ventilating duct 130 can easily pass through to the drum 140 by means of the through-holes 141 to dry the laundry within.

One side of the tub 160 communicates with the ventilating duct 130 that includes a ventilating fan 132 installed to forcefully blow air into the tub 160. To heat the air blown by the ventilating fan 132 through a ventilating inlet into the tub 160, a heater 131 may be provided.

Formed at the side of the tub 160 opposite to the ventilating inlet is an exhaust duct 170. The exhaust duct 170 extends to the outside of the washing machine to exhaust the hot air supplied into the tub 160 by the ventilating fan 130 to the outside.

Also, installed along a water supply pipe 180 is a detergent box 111, which is located below the upper plate 101 at the front of the washing machine. The detergent box 111 is a removable box that opens in one direction. At the end opposite to its opening direction, the detergent box 120 is coupled to the water supply pipe 180 that supplies cold/hot water. Cold or hot water is supplied through the water supply pipe 180 to the detergent box 120 to mix with detergent or fabric softener and be supplied through the wash liquid dispenser 125 into the tub 160.

FIG. 2 is an exploded perspective view of a motor according to the present invention.

Referring to FIG. 2, the motor 200 includes a rotor 220 and a stator 250. The rotor 220 has a comb polarizing ring 230 installed within and a permanent magnet 240 fitted to the comb polarizing ring 230.

The stator 250 has a stator frame 251. The stator frame 251 has a stator fixing hole 252 formed to receive a separate fixing member to be inserted therein. Thus, the stator frame 251 is fixed to the tub 160. For a secure fixing of the stator frame 251, a plurality of the stator fixing holes 252 spaced equally apart from one another may be formed therein. On the outer edge of the stator frame 251 are a plurality of winding portions 253 to have coils 254 wound therearound. When power is applied to the motor 200, the current passes through the coils 254, to change the winding portions 253 to electromagnets. Then, the electromagnetic attraction/repulsion forces that are formed between the winding portions 253 and the permanent magnet 240 to apply rotational force to the rotor 220. Reference number 255 in FIG. 2 is a Hall Sensor. The Hall Sensor 255 detects the position and speed of the rotor.

The rotor 220 includes a rotor frame 221. The rotor frame 221 has a predetermined diameter and is formed as a cylinder that is open on one side. A drive shaft through-hole 222 for the drive shaft 210 is formed in the center of the rotor frame 222. When the drive shaft 210 passes through the drive shaft through hole 222 and is fixed to the rotor frame 221. Thus, the rotor 220 is able to rotate integrally with the drive shaft 210, and rotating force of the motor is transferred to the drum 140. A plurality of cooling fins 223 are formed over the entire surface of the rotor frame 221, and cooling holes 224 are formed proximally to the cooling fins 223. When the rotor 220 rotates, the cooling fins 223 generate a cooling current, and air flows through the cooling holes 224 so that the heat generated within the motor is expelled to the outside.

A comb polarizing ring 230 is installed within the inner wall of the rotor frame 221. The comb polarizing ring 230 may be secured to the rotor frame 221 through press fitting or welding. The comb polarizing ring 230 has a body 231 having a predetermined radius. The body 231 is formed in one piece in the shape of a ring with a predetermined radius. A plurality of teeth 232 protrude a predetermined distance from the body 231. Gaps 233 may be formed between the teeth 232. In order to have an even polarity, the teeth 232 and the gaps 233 may have the same size and may be evenly distributed. The teeth 232 are disposed between the poles of the permanent magnet 240 and have a lower magnetism than the permanent magnet 240. The comb polarizing ring 230 is formed of a magnetic material with a coercive force of less than 200 kA/m. The comb polarizing ring 230 generates a reluctance torque during the operation of the motor 200.

The permanent magnet 240 is fitted into the comb polarizing ring 230. The permanent magnet 240 is formed with sections-alternating in N and S polarity. The permanent magnet 240 includes a body 241. The body 241 is formed in an integral ring with the same diameter as the body 231 of the comb polarizing ring 230. The body 241 has a plurality of protrusions 242, each being a permanent magnet. Gaps 243 may be formed between the protrusions 242. The permanent magnet 240 may be formed of a rare earth element-based magnet with a high magnetic force. In detail, the permanent magnet 240 may be formed of a compound of rare earth elements and rubber or plastic. When thus formed, the permanent magnet 240 retains a predetermined magnetic force while having flexibility. Accordingly, the permanent magnet may be manufactured as an elongated belt, after which the belt can easily be bent into the above-described annular shape with a predetermined diameter. The number of protrusions 242 of he permanent magnet 240 determines the number of poles of the motor 200. After the permanent magnet 240 is adhered to the inner wall of the rotor 220, and pressed radially against the wall. The permanent magnet 240 pressed against the wall generates a magnetic flux. That is, the permanent magnet 240 includes magnetic ingredients that impart rotational force to the motor 200. Reference number 225 in FIG. 2 is a positioning hole. The positioning hole 225 is formed on the lower surface of the rotor frame 221 to easily assemble the comb polarizing ring 230 and the permanent magnet 240.

Here, the size ratio of sections of the comb polarizing ring 230 to the sections of the permanent magnet may be any one of 1/17 to 6/12, 2/16 to 5/13, and 3/15 to 4/14.

FIG. 3 is a perspective view of a rotor of a motor according to the present invention, and FIG. 4 is a sectional view of the rotor in FIG. 3.

Referring to FIGS. 3 and 4, the rotor 220 includes a cylindrical rotor frame 221. The rotor frame 221 is open at a side thereof. A comb polarizing ring 230 and a permanent magnet 240 are installed within the rotor frame 221. Teeth 232 and gaps 233 are formed on the comb polarizing ring 230, and protrusions 242 and gaps 243 are formed on the permanent magnet 240. The comb polarizing ring 230 and the permanent magnet 240 are engaged together.

In the present embodiment, the teeth 232 are installed protruding towards the open side of the rotor frame 221, and the protrusions 242 are formed to protrude downward from the permanent magnet 240 to engage with the teeth 232. When thus formed, the comb polarizing ring 230 with low magnetism is disposed between the protrusions 242 of the permanent magnet. Accordingly, this configuration can take advantage of reluctance torque, so that the performance of a motor is the same as or better than that of a conventional motor, while the quantity of magnetic material is reduced. Thus, the manufacturing cost of the motor 200 is reduced. Also, because the comb polarizing ring 230 is reinforced, the rotor frame 221 becomes more rigid. Accordingly, concentricity and roundness of the motor 200 are improved so that vibration and noise during the operation of the motor 200 can be reduced.

The teeth 232 may be installed to extend toward the lower surface of the rotor frame 221, and the protrusions 242 of the permanent magnet 240 may be installed to extend upward.

FIG. 5 is a perspective view of a permanent magnet before it is installed in a rotor of a motor according to the present invention.

Referring to FIG. 5, the permanent magnet 240 includes a body 241. Protrusions 242 of the permanent magnet 240 extend regularly a predetermined distance from the body 241. In this configuration, the quantity of permanent magnet that needs to be used is reduced, to reduce the manufacturing cost of the motor 200.

The permanent magnet 240 is formed of strongly magnetized rare earth materials. Thus, the permanent magnet 240 may be formed of a compound including rubber or other material. Accordingly, the permanent magnet 240 has sufficient magnetic force while at the same time being bendable. In this embodiment, the permanent magnet 240 is formed in a belt shape of a predetermined length; however, it may also be formed in an annular shape with a predetermined diameter. The permanent magnet 240 may be halbach-magnetized.

A brief description of the operation of the motor 200 will now be provided.

First, the permanent magnet emits a field magnet magnetic flux. A counter electromotive force with phase preceding the phase of the magnetic flux by 90° is exposed to the coils 254. The Hall Sensor 255 installed on the stator 250 detects the rotational position and speed of the rotor 220.

According to load conditions, a current is applied with a phase offset from that of the magnetic flux by a predetermined amount, so that the rotor 220 rotates according to Flemming's Left-hand Law. Thus, the rotational force of the motor 200 is generated.

In order to generate maximum torque during a wash cycle, in a washing machine 100 employing the motor 200, the phases of the current are controlled to be in phase with phases of counter electromotive force; and to generate high speed in the spin cycle, the phases of current are controlled to precede the phases of counter electromotive force.

In the above-structured motor and washing machine employing the motor, a comb polarizing ring having teeth is installed in the rotor frame, and a permanent magnet having protrusions is fitted to the comb polarizing ring. Thus, the performance of the motor is equal to or better than that of a conventional motor, while using less permanent magnet material. Accordingly, the manufacturing cost of the motor is reduced.

Also, in the motor and the washing machine using the motor according to the present invention, the comb polarizing ring reinforces the rotor frame to increase its rigidity. Therefore the motor has improved concentricity and roundness, which leads to less vibration and noise during operation.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A motor having a stator and a rotor rotating against the stator, the motor comprising:
   a rotor frame;
   a permanent magnet installed on the rotor frame, the permanent magnet including a body having a plurality of protrusions extending therefrom with alternating North and South polarities; and
   a comb polarizing ring including a plurality of teeth disposed between the protrusions of the permanent magnet, and formed of a material with a magnetism that is weaker than a magnetism of the protrusions.

2. The motor according to claim 1, wherein the comb polarizing ring has coercive force of less than 200 kA/m.

3. The motor according to claim 1, wherein the teeth of the comb polarizing ring have a size ratio to the protrusions of the permanent magnet that lies in any one range of 1/17 to 6/12, 2/16 to 5/13, and 3/15 to 4/14.

4. The motor according to claim 1, wherein the comb polarizing ring is formed in an integral ring shape.

5. The motor according to claim 1, wherein the teeth of the comb polarizing ring protrude in a direction toward an open side of the rotor frame, and the protrusions of the permanent magnet protrude in a direction opposite to the protruding direction of the teeth, for engaging with the teeth.

6. The motor according to claim 1, wherein the teeth of the comb polarizing ring protrude toward a bottom surface of the rotor frame, and the protrusions of the magnet protrude in a direction opposite to the protruding direction of the teeth, for engaging with the teeth.

7. The motor according to claim 1, wherein the permanent magnet is formed of ferromagnetic rare earth materials in an elongated belt shape of a predetermined length.

8. The motor according to claim 7, wherein the permanent magnet is a halbach-magnetized.

9. The motor according to claim 1, wherein the rotor frame includes a positioning hole for assembling the comb polarizing ring to the permanent magnet.

10. A washing machine comprising:
- a cabinet;
- a tub installed inside the cabinet, for holding wash liquid;
- a drum installed inside the tub, for holding laundry; and
- a motor including;
    - a permanent magnet installed on a rotor frame, the permanent magnet including a body having a plurality of protrusions extending therefrom forming alternating North and South polarities; and
    - a comb polarizing ring having teeth disposed between the protrusions of the permanent magnet and formed of a material having a weaker magnetism than the permanent magnet and, and a stator coupled to the rotor, wherein the motor imparts rotational force to the drum.

11. The washing machine according to claim 10, wherein the comb polarizing ring has a coercive force of less than 200 kA/m.

12. The washing machine according to claim 10, wherein the teeth of the comb polarizing ring have a size ratio to the protrusions of the permanent magnet that lies in any one range of 1/17 to 6/12, 2/16 to 5/13, and 3/15 to 4/14.

13. The washing machine according to claim 10, wherein the comb polarizing ring is formed in an integral ring shape.

14. The washing machine according to claim 10, wherein the teeth of the comb polarizing ring protrude in a direction toward an open side of the rotor frame, and the protrusions of the permanent magnet protrude in a direction opposite to the protruding direction of the teeth, for engaging with the teeth.

15. The washing machine according to claim 10, wherein the teeth of the comb polarizing ring protrude toward a bottom surface of the rotor frame, and the protrusions of the magnet protrude in a direction opposite to the protruding direction of the teeth, for engaging with the teeth.

16. The washing machine according to claim 10, wherein the permanent magnet is formed of ferromagnetic rare earth materials in an elongated belt shape of a predetermined length.

17. The washing machine according to claim 16, wherein the permanent magnet is halbach-magnetized.

18. The washing machine according to claim 10, wherein the rotor frame includes a positioning hole for assembling the comb polarizing ring to the permanent magnet.

* * * * *